Sept. 13, 1927.

C. G. WOOD

CLUTCH

Filed Aug. 8, 1924

INVENTOR
Clarence G. Wood
BY
ATTORNEYS

Sept. 13, 1927.  
C. G. WOOD  
CLUTCH  
Filed Aug. 8, 1924  
1,642,475  
2 Sheets-Sheet 2

INVENTOR  
Clarence G Wood  
BY  
Blackmore, Spencer & Hiet  
ATTORNEYS

Patented Sept. 13, 1927.

1,642,475

UNITED STATES PATENT OFFICE.

CLARENCE G. WOOD, OF MUNCIE, INDIANA.

CLUTCH.

Application filed August 8, 1924. Serial No. 730,944.

This invention relates to clutches, and is illustrated as embodied in several different forms in automobile clutches of the plate or disk type. An object of the invention is to cushion shocks on the transmission mechanism, for example from impulses given the crankshaft by explosions in the several engine cylinders, when the clutch is let in suddenly, and to cushion shocks transmitted back to the engine from the road wheels, by the use of springs or equivalent yielding means arranged to connect the clutch plate and the driven shaft, so that the shaft is driven through the springs. This construction also facilitates shifting from a higher to a lower gear on a hill. The details of the several constructions, and their respective advantages, will be apparent from the following description of several illustrative embodiments shown in the accompanying drawings, in which:

Figure 1:
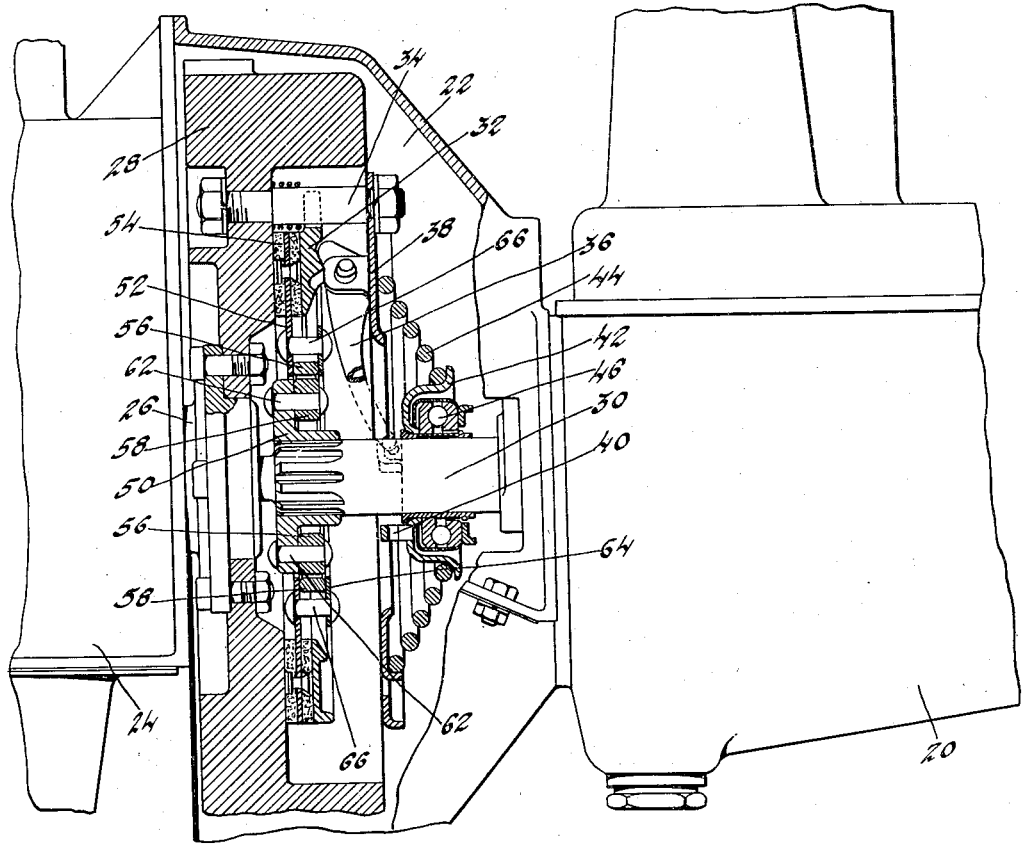
Figure 1 is a side elevation of a transmission, clutch, and engine, with the clutch broken away and shown partly in vertical section.

The arrangement shown in Figure 1 includes a transmission 20, a clutch in a housing 22, and an engine 24 having a crankshaft 26 with a flywheel 28, the flywheel ordinarily forming also a part of the clutch. The clutch, which may be used with any one of the clutch plates shown in Figures 2 to 8, but which in Figure 1 is shown with the plate of Figure 2, drives the transmission yieldingly through a driven shaft 30. The clutch plate is clamped between the flywheel 28 and a clutch ring 32 keyed on bolts 34 to rotate with the flywheel, by levers 36 pivoted on a support 38 held by the bolts 34 axially spaced from the flywheel. The levers have their ends hooked into loops 40 pressed out of a stamping 42 having a flange engaged by the clutch spring 44 to throw the clutch in. The clutch is thrown out against the resistance of spring 44 by a clutch release bearing 46 operated by depression of the clutch pedal (not shown). Except as further described below, the above-identified parts may be of any desired construction.

Figure 2:
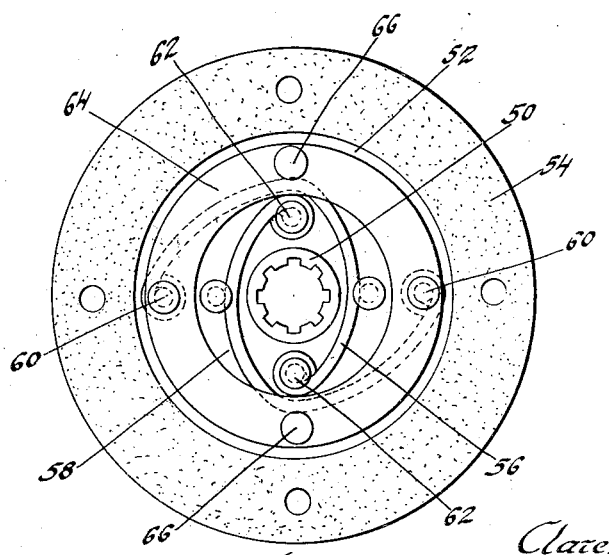
Figure 2 is a rear elevation of the clutch plate of Figure 1.

In the form shown in Figures 1 and 2, the clutch plate includes a hub 50 splined on shaft 30, and an annular plate or disk 52, shown faced with friction material 54. Spiral springs 56 and 58 connect the hub and disk, thus forming the driving means for shaft 30. Each spring is looped about a rivet 60 connecting it to disk 52 at its outer end, brought around the inner end of the other spring, and then looped about a rivet 62 connecting it to hub 50 at its inner end. The springs are confined laterally by disk 52 and an annular plate 64 held by the rivets 60 and by extra rivets 66. The springs 56 and 58 are U-shaped in form, as will be observed, and are comparatively stiff; and their inner ends are connected with the hub 50 at the points 62, 62 diametrically opposite one another, while the outer ends of these springs are connected with the disc 52 at the points 60, 60 which are likewise diametrically opposite one another, and are spaced angularly substantially 90 degrees from the points of connection 62, 62 between their inner ends and the hub 50. This provides an extremely stiff coupling between the shafts 26 and 30 but at the same time one which will yield sufficiently to prevent the transmission of shocks from one of said shafts to the other.

Figure 3:
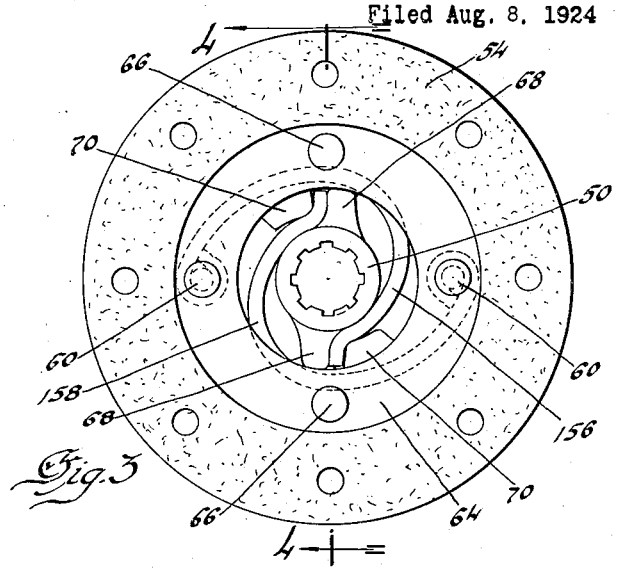
Figure 3 is a similar rear elevation of a modified form of clutch plate;
Figure 4:
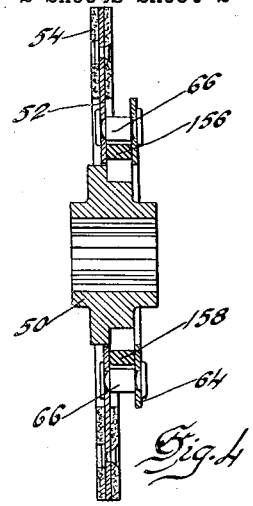
Figure 4 is a section on the line 4—4 of Figure 3.
Figure 5:
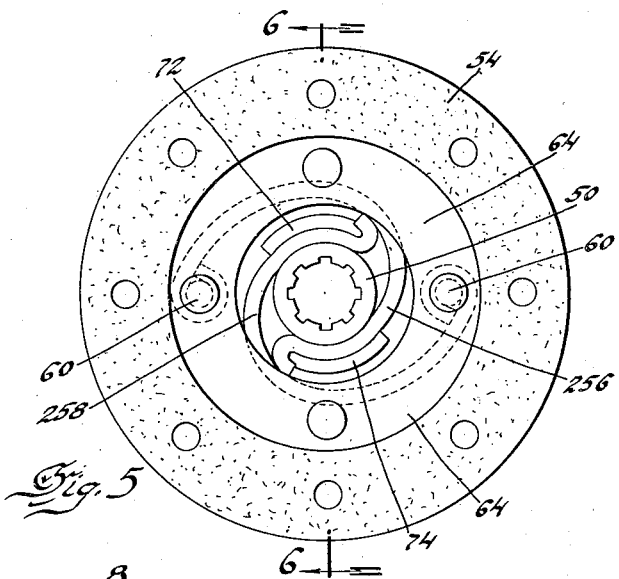
Figures 5 and 6 are respectively a rear elevation and a vertical section showing a second modification;
35
Figure 6:
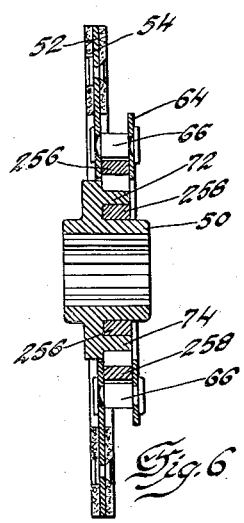
Figure 7:
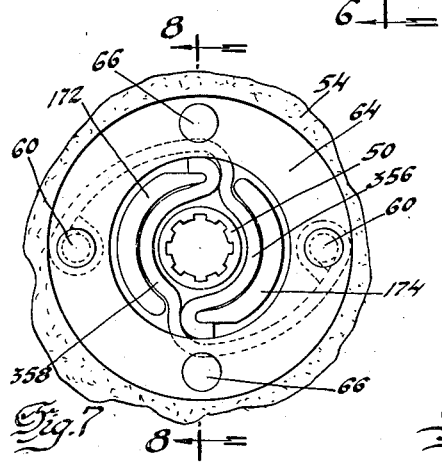
Figures 7 and 8 are respectively a rear elevation and a vertical section showing a third modification.
Figure 8:
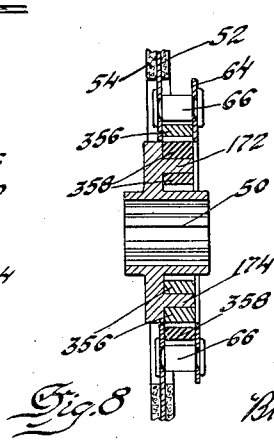

The plate shown in Figures 3 and 4 differs from that described above, in that springs 156 and 158 are secured to hub 50 by being sprung into recesses defined by pairs of lugs 68 and 70 formed on hub 50. In the modification of Figures 5 and 6, the inner ends of springs 256 and 258 are hooked over lugs 72 and 74 formed on hub 50. A similar arrangement is shown in Figures 7 and 8, except that the springs 356 and 358 and the lugs 172 and 174 are different in form. In all forms of my device as will be appreciated substantially the same comparatively short and stiff springs, U-shaped in form, are made use of; the outer ends of the springs being secured to the disc 52 at diametrically opposite points, and their inner ends to the hub 50 likewise at diametrically opposite points which, however, are disposed substantially 90 degrees from the first mentioned points.

While a number of modifications of the invention have been described in detail, it is not the intention to limit its scope to those particular embodiments, or otherwise than by the terms of the appended claims.

I claim:

1. In a clutch of the class described, a rotating hub; a clutch plate surrounding said hub; and two springs intermediate said hub and plate and through which one is driven from the other; said springs being U-shaped in form and the outer ends thereof being connected with said plate at diametrically opposite points, and the inner ends to said hub also at diametrically opposite points spaced, however, substantially 90 degrees from said first mentioned points.

2. In a clutch of the class described, a rotating hub; a clutch plate surrounding said hub; and two springs intermediate said hub and plate and through which one is driven from the other; said springs being U-shaped in form and the outer ends thereof being connected with said plate at diametrically opposite points, and the inner ends to said hub also at diametrically opposite points spaced, however, substantially 90 degrees from said first mentioned points; said springs partially enclosing one another and being parallel, and lying both in the same plane at right angles to the axis of rotation of the hub and disc.

In testimony whereof I affix my signature.

C. G. WOOD.